US006772048B1

(12) United States Patent
Leibu et al.

(10) Patent No.: US 6,772,048 B1
(45) Date of Patent: Aug. 3, 2004

(54) VENDING MACHINE SYSTEM

(75) Inventors: Mark H. Leibu, St. Louis, MO (US); Gilbert W. Van Cleve, Ballwin, MO (US)

(73) Assignee: Coin Acceptors, Inc., St. Louis, MO (US)

( * ) Notice: Subject to any disclaimer, the term of this patent is extended or adjusted under 35 U.S.C. 154(b) by 128 days.

(21) Appl. No.: 09/970,623

(22) Filed: Oct. 3, 2001

(51) Int. Cl.[7] .................................................. G06F 17/00

(52) U.S. Cl. ........................ 700/241; 700/232; 221/131

(58) Field of Search ................................. 700/231, 232, 700/236, 237, 241, 244; 221/131

(56) References Cited

U.S. PATENT DOCUMENTS

| | | | | |
|---|---|---|---|---|
| 4,412,292 A | | 10/1983 | Sedam et al. | 364/479 |
| 4,766,548 A | | 8/1988 | Cedrone et al. | 364/479 |
| 5,207,784 A | | 5/1993 | Schwartzendruber | 221/6 |
| 5,450,938 A | * | 9/1995 | Rademacher | 194/206 |
| 5,544,784 A | | 8/1996 | Malaspina | 221/135 |
| 5,647,220 A | | 7/1997 | Kawaguchi et al. | 62/89 |
| 5,701,252 A | * | 12/1997 | Facchin et al. | 235/375 |
| 5,787,149 A | | 7/1998 | Yousefi et al. | 379/59 |
| 5,930,771 A | * | 7/1999 | Stapp | 705/28 |
| 5,941,363 A | * | 8/1999 | Partyka et al. | 194/217 |
| 5,960,344 A | | 9/1999 | Mahany | 455/432 |
| 5,997,170 A | | 12/1999 | Brodbeck | 364/479.06 |
| 6,038,491 A | | 3/2000 | McGarry et al. | 700/231 |
| 6,056,194 A | * | 5/2000 | Kolls | 235/381 |
| 6,430,470 B1 | * | 8/2002 | Nakajima et al. | 700/237 |
| 6,462,644 B1 | * | 10/2002 | Howell et al. | 340/5.92 |
| 6,487,540 B1 | * | 11/2002 | Smith et al. | 705/21 |
| 6,535,726 B1 | * | 3/2003 | Johnson | 455/406 |

OTHER PUBLICATIONS

PCT WO 00/38443, International Publication date Jun. 29, 2000, Rasanen et al.*

PCT WO 99/22346, International Publication May 6, 1999, Stewen et al.*

Alfred B. Vollmer, "With Devices Ready To Go, Bluetooth Is Poised To Make Its Move", Electronic Design, Jul. 24, 2000, pp. 85–92 (No. pp. 87 or 91).

Peter L. Fuhr, San Jose State University, "Bluetooth", Sensors DA, Aug. 2000, pp. 90–94.

18 page compilation of printouts of various web pages available on or about Jan. 18, 2001, that addressed Bluetooth technology.

* cited by examiner

*Primary Examiner*—Khoi H. Tran
(74) *Attorney, Agent, or Firm*—Haverstock, Garrett & Roberts LLP

(57) ABSTRACT

A system for controlling one or more vending machines each of which has an associated module which can send and receive radio frequency signals, the system including a central data collection device which includes a device for sending radio frequency signals which can be intercepted by and used to control the operation of a selected one or more of the vending machines, each vending machine having elements for using the radio frequency signals it receives from the central data collection device to vend products selected by a customer, the central collection device includes a mechanism for determining the amount of deposits or credit entry in excess of the selected vends for returning this excess deposits or credit entry to the customer based on the amount of credit or deposits entered and the cost of the products selected to be vended by the vending machines.

69 Claims, 7 Drawing Sheets

VENDING MACHINE SYSTEM

The present invention is directed to the vending machine art, and more particularly to a device which accepts credit including coins and currency as well as credit card and smart card entries, and uses the information it receives to control the operation of one or more vending machines, and it does so without requiring any electrical wire connections between the vending machines. The invention has several novel features as described in detail hereinafter including the fact that one or more modules of one or more vending machines can be equipped with a "short distance RF communication" device. Another novel feature resides in the fact that only one vendor need be so equipped to allow receiving of credit but all of the vendors can vend products for that credit. The present wireless system can also monitor wireless systems of vending machines from a central location as will be described. The present device accomplishes these novel things without the possibility of third parties being able to tap into and cheat the system. This makes the present system particularly adaptable to situations where two or more vending machines or the like are controlled and it enables every vending machine that is controlled by the subject device to be operated independently and the amount of credit entered can be used to vend articles from one or from a plurality of machines each of which may or may not have the same or similar type of products. It can therefore be seen that the present invention teaches the construction and operation of means for safely and accurately controlling the operations of a plurality of different things such as vending machines without requiring any physical connection between the machines. The present invention also enables the use of a telephone or telephone-like device to be used to gather information and to produce controls in a manner which has not heretofore been seen, particularly in the vending art.

The present device or system eliminates the need for physical connections such as wire or cable connections between the controls and the devices being controlled and can use a controller of a known construction to control one or more vending machines or the like. Such a device will typically have a base band control formed of firmware and will operate as a host controller for controlling the operations of many different vending machines or the like, and it can be constructed to do so without requiring more than one host controller.

In summary, the present device has two principal novel features including being a wireless communication system which may be used to control vending machines or like devices and only one device need be equipped to receive credit but any one or more of a plurality of vending or like machines can be controlled to dispense products, make change or perform other functions for an established credit entry or deposit. The present invention represents a versatile and flexible control which can be used to control a plurality of the same or similar devices.

BACKGROUND OF THE INVENTION

The present invention is directed to a new and relatively inexpensive method of intercommunicating and controlling machines without requiring the usual harnesses and other electrical connections, and the present invention provides a broadly based way of credit accumulation and a flexible way for communicating with vending machines or like devices to control the operations thereof and to keep track of the credit that remains.

OBJECTS OF THE INVENTION

It is a principal object of the present invention to provide means for controlling the operations of vending machines and like devices, including controlling the vending and other operations, including the entries of deposits or credit, the dispensing of the product or products being vended, and the return of excess deposits or credit entries to the customer without the use of the internet or an external harness that connects the modules, but rather in a wireless configuration.

Another object is to control the operation of one or more vending machines without requiring any electrical or other physical connections between the machines.

Another object is to provide means for controlling vending machines and the like in a manner which makes it much more difficult for third parties to tap into or interfere with or cheat the system including the change making procedures.

Another object is to provide a relatively versatile easy to operate means for controlling a number of operations including a number of machines operated from the same or from a common source.

Another object is to provide means for making it difficult for third parties to tap into or interfere with the operation of devices such as vending machines and the controls therefor.

BRIEF DESCRIPTION OF THE DRAWINGS

FIG. 1 is a block diagram of the various controls that can be used to control the functions of a vending machine or the like;

DESCRIPTION OF PREFERRED EMBODIMENTS

Figure 1:
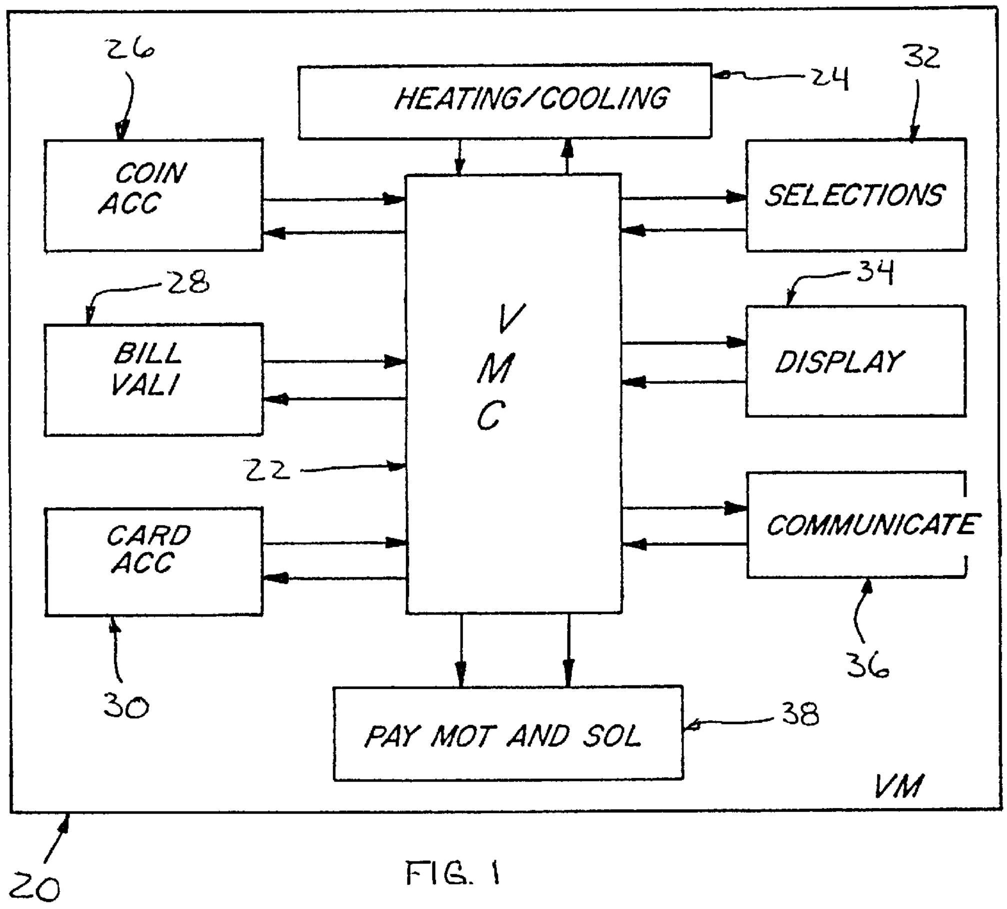

Referring to the drawings more particularly by reference numbers, number 20 in FIG. 1 identifies a block diagram showing the general components of a vending machine in a parallel configuration. The components 20 include a control portion 22 which has a plurality of connections to various control devices including to a heating and/or cooling unit 24, a coin accumulation control 26, a bill validator control 28, a credit card control portion 30, a first selection control portion 32 which enables the customer to select a particular product or products desired, a display control 34, a communication control 36 and a payout motor control including a solenoid portion 38 which controls the refunding of excess amounts deposited. All of the controls 24≧38 are connected to the vending machine control and are used to control the various operations of the vending machine.

Figure 2:
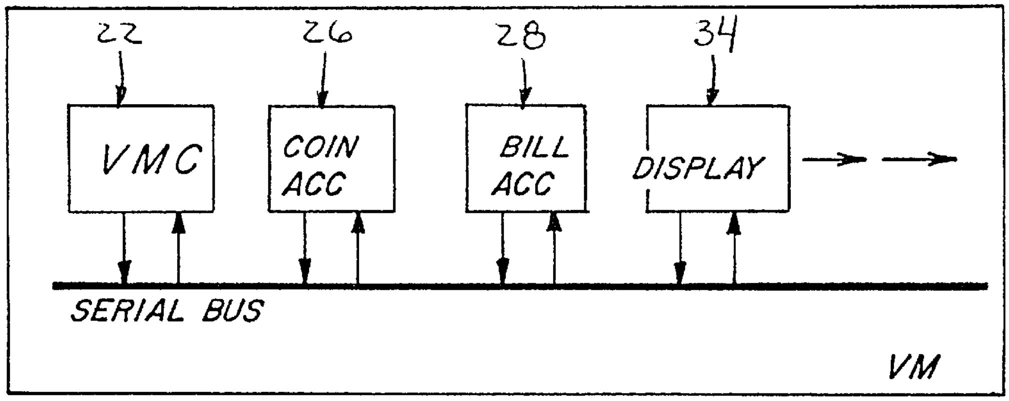
FIG. 2 is another block diagram of a control configuration for controlling the operation of a vending machine.

FIG. 2 shows another variation of the controls for the vending machine including a serial configuration wherein the vending machine control portion 22 is controlled by a serial configuration including the coin accumulation means 26, the bill validator 28 and the control display 34 all serially connected.

Figure 3:
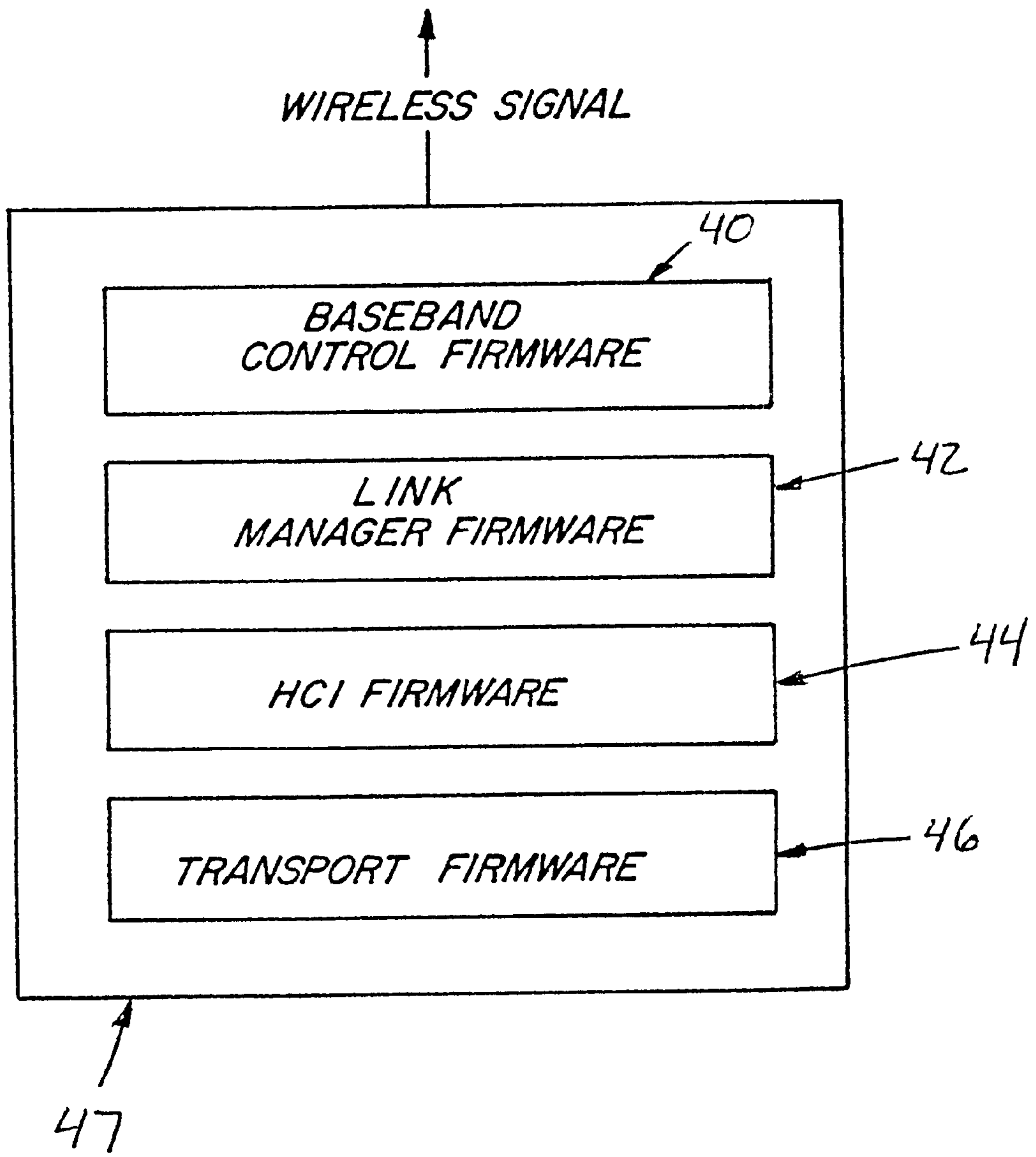
FIG. 3 is a block diagram of the hardware control means to be added to every intelligent module of the vending machine.

FIG. 3 is a schematic block diagram of the controls for controlling the operation of one or more vending machines wherein the control means do not require any wire or other physical connection between the control means and the vending machines. The block diagram shown in FIG. 3 includes a base band control firmware section 40, a link manager firmware section 42, a host controller interface firmware section 44 and a transport firmware section 46. The hardware shown in FIG. 3 is shown in schematic form which sometimes is referred to as a module 47, one of which will be attached to every machine module or host which is to be controlled by the subject system. The schematic shown in FIG. 3 can be controlled in a manner somewhat similar to a radio, a television or telephone and does not require any physical connections between the member or members being controlled and the control is accomplished by transmitting and receiving signals such as radio frequency signals which can be controlled in such a manner that they can not be taken advantage of or entered by outsiders. The vending machines controlled by the subject invention are equipped with wireless communicator devices such as short distance wireless communicator devices and the vending machine harnesses or wire connections employed heretofore are eliminated when using the present device.

Figure 4:
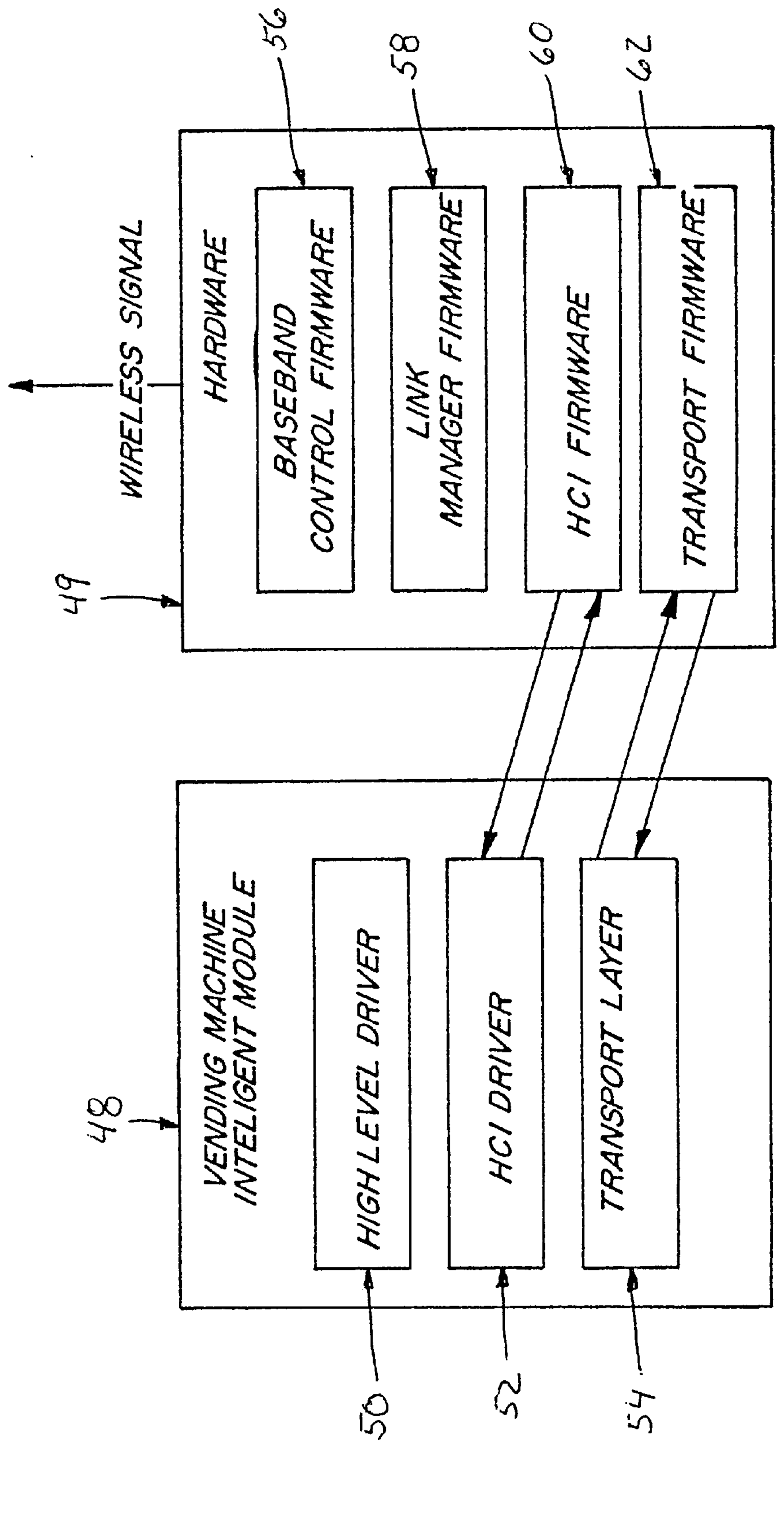
FIG. 4 is a block diagram of the modules in the vending machine after the machine has been adapted per this invention.

FIG. 4 is a block diagram showing the interconnections between a vending machine intelligence module 48 and control module 49. The vending machine intelligence module 48 includes a high level driver portion 50, a host controller interface driver 52, and a transport layer shown as block 54. The control portion includes base band control firmware 56, a link manager 58, a host controller interface firmware portion 60 and a transport firmware portion 62.

Figure 5:
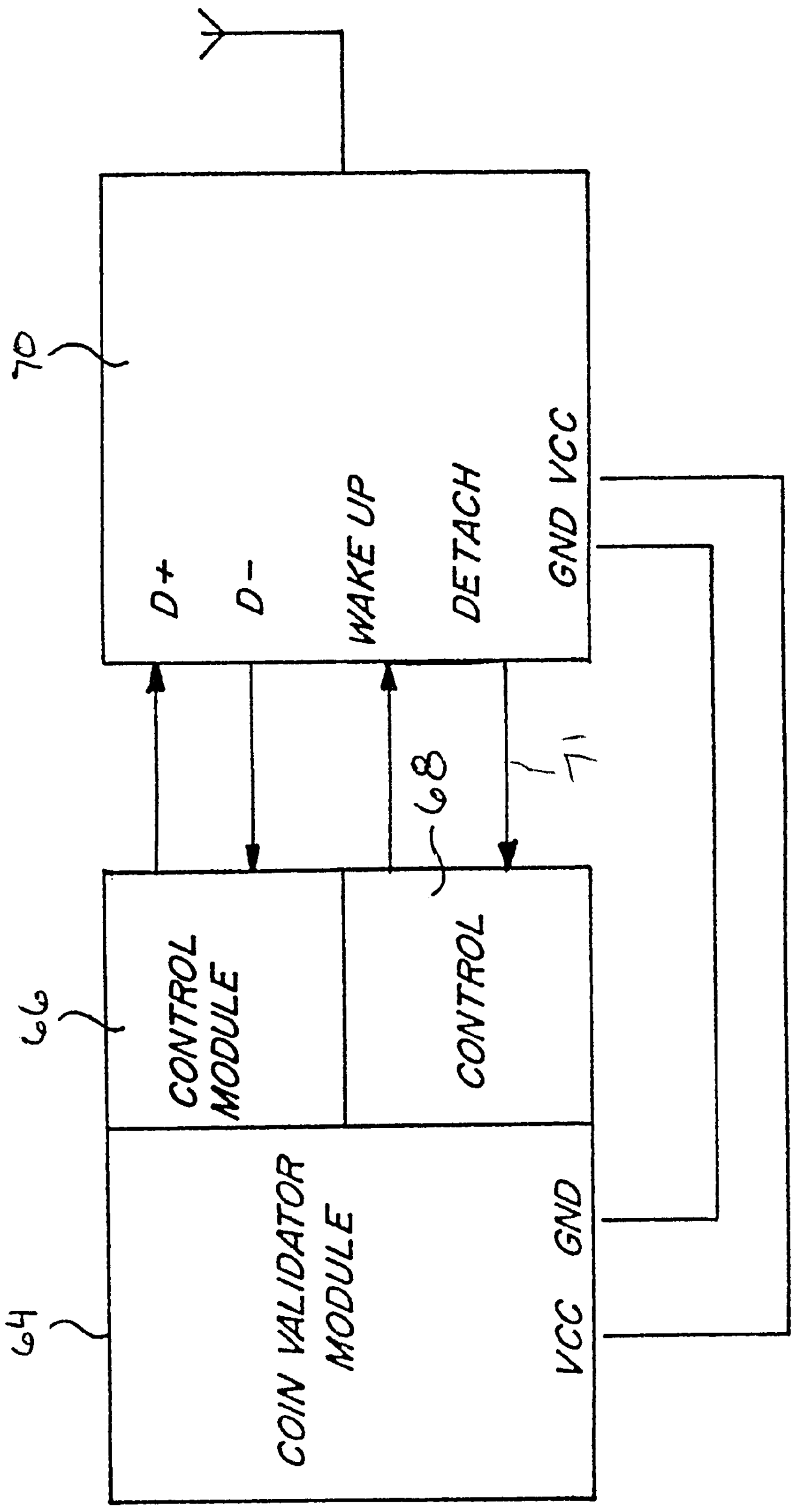
FIG. 5 is a block diagram of the changer module for use in the subject invention.

FIG. 5 is a block diagram showing a coin validator module 64 with electrical and other connections thereto. The coin validator module 64 has associated with it modules 66 and 68, and an associated control module 70 which has a wake-up connection with the control module 68, and a detach connection 71 with the same control module 68. Other circuit connections are also provided between the coin validator module 64 and the control module 70.

Figure 6:
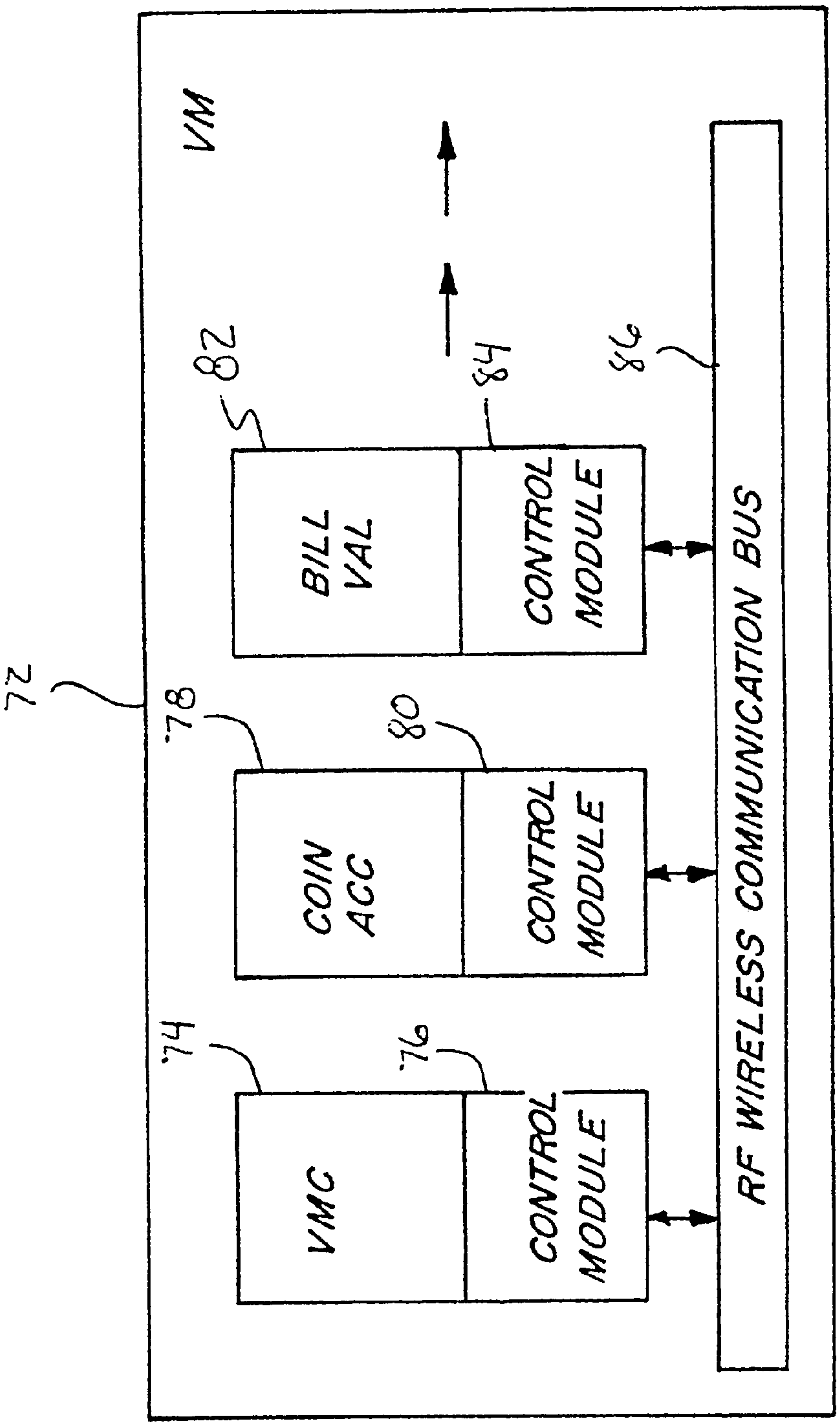
FIG. 6 is a block diagram depicting the use of a wireless relationship between control means and a vending machine controlled thereby.

FIG. 6 illustrates a wireless vending machine 72 with a vending machine control 74, a control module 76 associated with the vending machine control 74, a coin or credit accumulator circuit portion 78, an associated control module 80, and a bill validator module 82 also associated with its own control module 84. The modules 76, 80 and 84 are also associated with a radio frequency wireless communication bus 86.

An important aspect of the present invention resides in the fact that it may be used with vending machines that provide a way for a customer to use them when depositing or entering credit in one form or another and in being able to use the established credit in any one or more of a plurality of vending machines. In other words, the same deposit can be used with one or with a plurality of vending machines depending upon the desires of the customer and the products vended by the various vending machines. In this case, every vending machine in the system will be coupled to the same RF wireless communication bus 86 and all of the venders will be able to communicate with each other on the same or similar radio frequency bus. One, and only one vending machine needs to be equipped with means for accepting money either in the form of coins, bills, credit cards or the like, and this represents an important advantage because it means that a plurality of vending machines can be controlled by the same or similar control means sometimes referred to as an RF module.

Each of the venders included in the present system may be equipped or not equipped to, vend products to customers but the system always has the ability to accumulate the customer's credit that can be received by one or a plurality of means and the credit can be used by any one or more of the vending machines that make up the system to enable the customer to choose products from any of the machines even though all of the credit is entered in the same or similar machine. It is also possible with the present system for the customer to use means to identify himself or herself to a particular vender in the system that holds the product or products to be purchased. The central payment machine will then receive the credit from the customer, release a numeric code, coupon or other means that the customer can later use to identify himself or herself to anyone of the venders in the system and to control the amount of money or credit that is deposited or entered so that the proper amount will be deducted as products are ordered and dispensed and appropriate change or credit is made. After identification of the customer, the customer can purchase the selected product or products for the credit accumulated and will be paid back any excess deposited regardless of which products are purchased and the amount of credit that has been deposited or entered.

The present system has several novel features about it including the importance of using a wireless communication system such as a wireless vending machine system, and only one vending machine needs to be equipped to receive credit but any one or more can dispense a product or products for the established credit, keeping in mind that the appropriate amount of change will be returned to the customer based upon the amount of credit entered and the cost of the product or products that are purchased.

Figure 7:
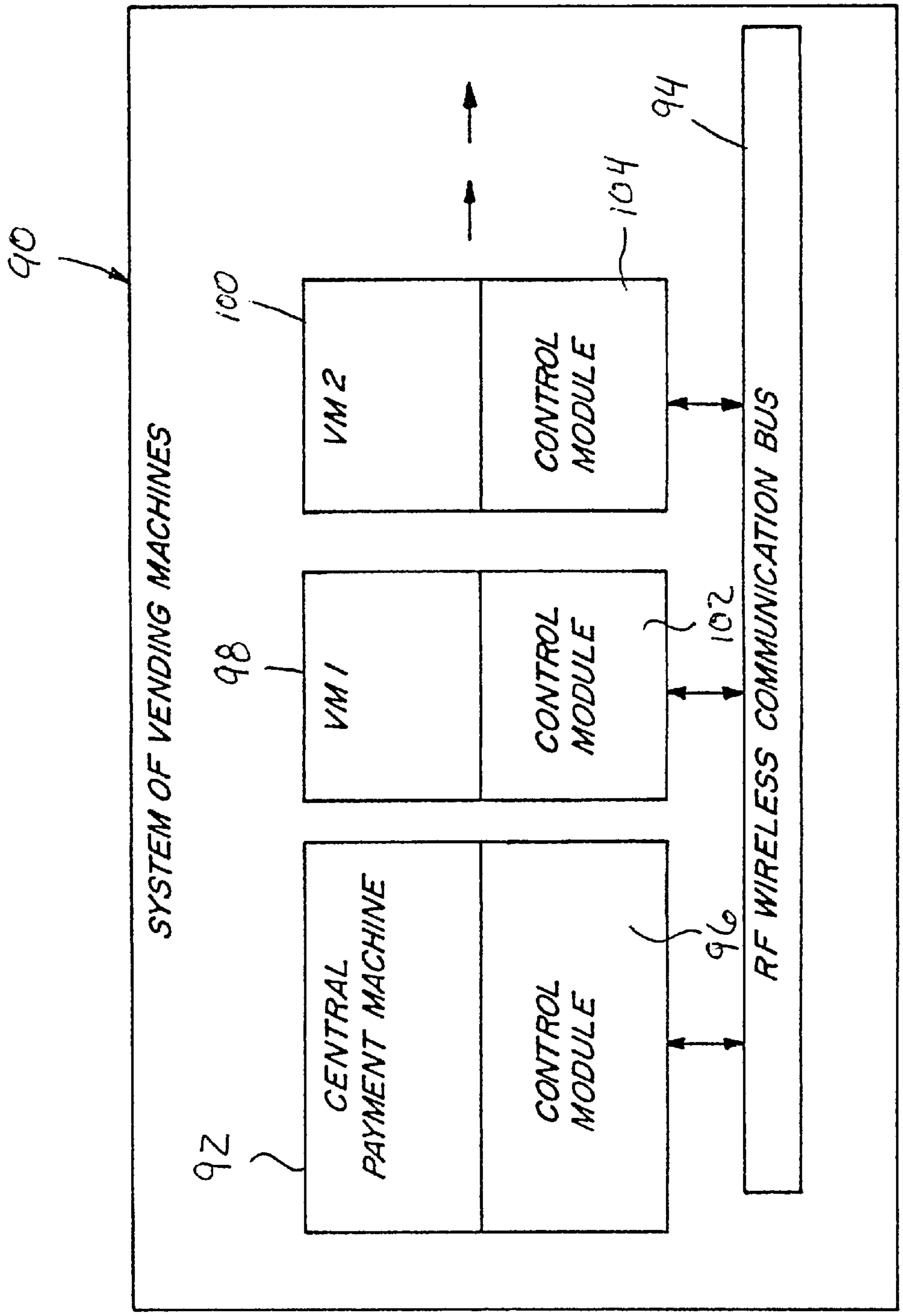
FIG. 7 is a block diagram of the present device used for controlling a plurality of vending machines.

FIG. 7 shows another embodiment 90 of the invention that relates to a method of monitoring data from a system such as a system of vending machines to a central location. In this embodiment, the central payment machine is replaced with a central data collection machine 92. In this system, the vendor transmits all of the input data to an external device equipped with a radio frequency (RF) wireless bus 94. The external device can be a modem, an interface to an internet device, a cellular telephone, a long distance radio frequency device, or something similar that can eventually send data to a specific central location. In FIG. 7, there is a central data collection machine 92 operator in association with, an associated control module 96 which is connected to the RF wireless communication bus 94, and the RF wireless communication bus 94 can in turn be made to transfer information to one or more vending machines such as machines 98 and 100, each of which has its own control module 102 and 104.

Figure 8:
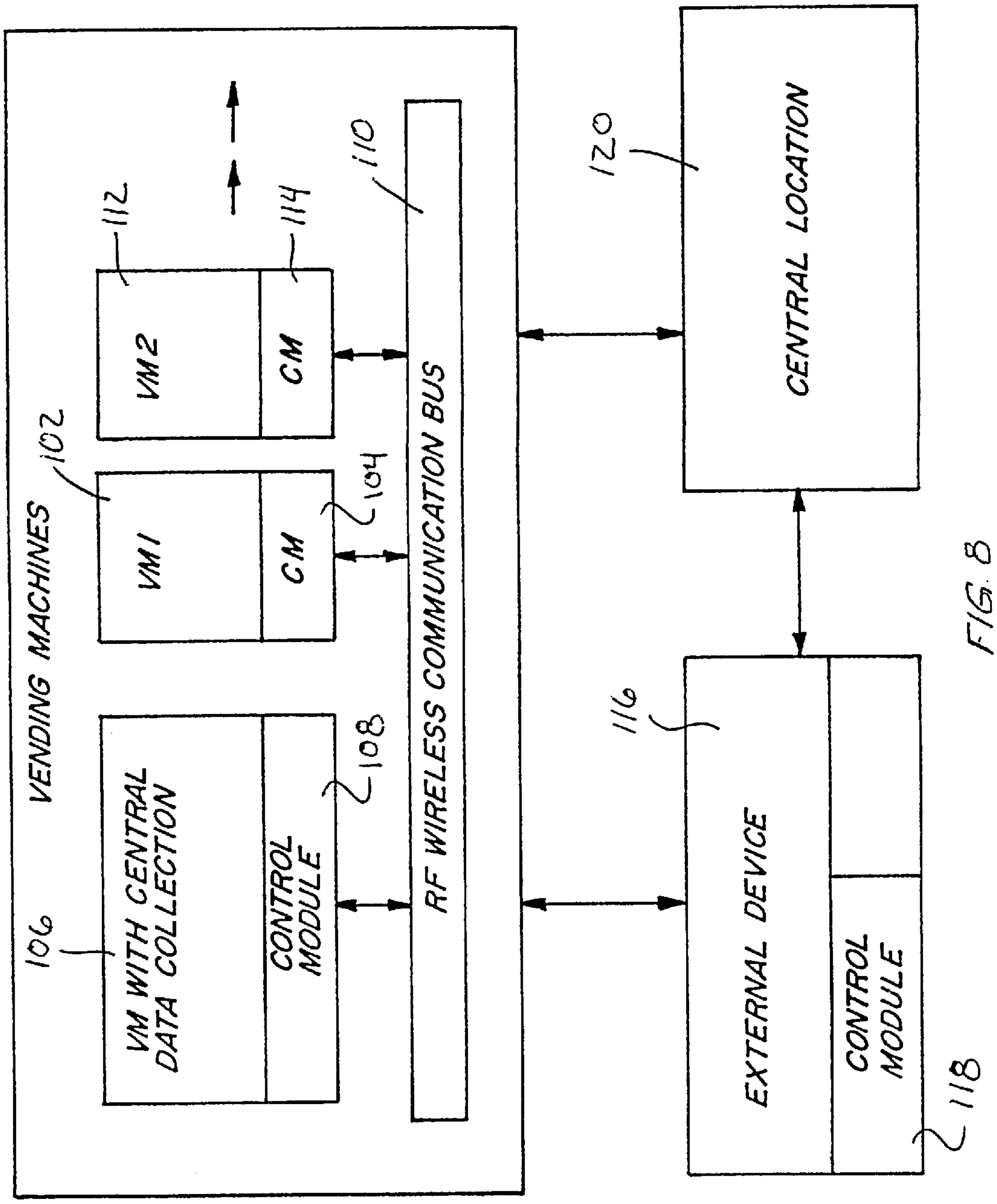
FIG. 8 is a block diagram similar to FIG. 7 but showing the inclusion of additional controls for the subject device.

FIG. 8 shows another embodiment which also teaches a way of interconnecting vending machines and modules. In this case, the vending machine 100 has a control module 104 and includes a central data collection portion 106 which is able to communicate through control module 108 with RF wireless communication bus 110. This embodiment has another vending machine 112 and its control module 114 which likewise can communicate with the central data collection portion 106 through the RF wireless communication bus 110. In the case of the embodiment shown in FIG. 8, there is also provided an external device 116 with an associated module 118. The external device 116 communicates with the vending machines 102 and 112 disclosed above as well as with a central location device 120 which in this case may be the location where the customer deposits his money or enters his credit and gets his change. In this case the customer is able to select articles from one or more vending machines and have any excess deposit returned.

As indicated above, one of the important aspects of the present invention resides in the fact that the present system, regardless of which embodiment is chosen, is a wireless system which can be made to operate within a desired range or distance and provides the customer as well as the owner of the system with many options and with an absence of wire connections between the various system elements. Thus there has been shown and described, several embodiments of a system such as a vending machine system which does not require wire connections between the vending machines and the control means therefor and yet is able to vend one or more products from one or more vending machines and it can do so while also enabling the customer to be paid back any excess deposit or credit entry. Thus the present system is highly flexible and versatile is relatively inexpensive to make and can be used to control one or more machines.

The fact that the present system does not require any hardwire connections between the control unit or units and the machines being controlled thereby adds to the flexibility and versatility of the system and enables the present system to be used with systems such as Bluetooth systems which are systems that do not require physical connections between the various units that are controlling and controlled. The present system does, however, use radio frequency (RF) networking technology, and provides an energy-saving, safe, and low cost RF technology without cable connections being required. It is also important to note that with this type of wireless RF connection the devices being controlled and doing the controlling can communicate amongst each other without having a line of sight or physical connection. The present system can also use frequency hopping which provides a high level of security against eavesdropping and fraudulent access. These are important advantages, especially in a system such as one that controls one or more vending machines which usually are located in relatively close proximity to one another or may be separated by greater distances depending on the strength of the RF signals that are used. In this regard, the present system can also support "point-to-point" and "point-to-multipoint" connections and the same or similar control can be used to control vending machines in more than one location, so long as the distance that the RF signals can be transmitted is known and made available. The present invention also provides a new method that a customer can use to deposit money or enter credit and still be able by doing so to establish credit that can be used in any of a plurality of venders. In such a system every one of the vending machines is equipped with an RF virtual communication bus as described above and all of the venders in the system can communicate with each other over the RF bus. In a typical system, one and only one vending machine may be equipped with means for accepting money or credit and this machine can be referred to as the central payment machine. This vender may be equipped or not to vend products to the customer, but it always has the function of accumulating the customer's credit and enables this credit to be used by any one or more of the vending machines that make up the system. The customer may also be able to establish his identity to a particular vender that holds a product or products that he wants to purchase. In this case the central payment machine will receive the credit from the customer and may release a "numeric code", a "coupon," or other means that the customer can later use to identify himself to any one or more of the venders in the system. Thereafter the customer can purchase products from any one of the venders in the system to use up the balance of the credit. Thus, the present system has several novel features, including being a wireless communication system in which one or several machines are equipped to receive credit, but any one or more of the machines in the system can vend a product or products for the credit that has been established in the system.

Yet another aspect of the present invention is that it produces a novel method of monitoring data from one part of a system to another such as to a central location. The data that is monitored can then be used to produce later vending operations or return of excess cash or credit. In the system as is shown in FIG. 8, the central payment machine is replaced with a central data collection machine and this vender will communicate all of the data to an external device equipped with a similar radio frequency wireless bus that can be used to transmit the information stored between the machines that are parts of the system. The external device in such a system could be a modem, an interface, a cellular telephone, a long distance radio frequency device, or a similar device such as shown in FIG. 8.

Thus there has been shown and described, several embodiments of a wireless system, particularly adaptable to control the operations of one or more vending machines or the like to accumulate cash or credit, to produce change when necessary, and to vend a product or products to a customer as required. Such a system is easy to operate by the customer and by the owner of the system and makes it possible to produce many operations including keeping track of more things than is presently available including in the vending industry. For example, with the present system, if one vending machine runs out of a product that is being vended in more than one machine, the customer can obtain the product from a different vending machine based on the amount of credit that he has established. Also the present device enables the owner of the vending machine to have a better means of keeping track of the amount of money received and paid out as well as the amount of product or products vended by each machine. The present invention therefore has major advantages both from the owner's and from the user's standpoint.

What is claimed:

1. A system for enabling wireless communications among a plurality of vending machines and operation by one of such plurality of vending machines based upon credit deposits made at another of such plurality of vending machines, comprising a plurality of vending machines at least a first of which includes a vend dispensing portion, at least a second of which includes a credit entry portion, and at least one of which includes a vend selection portion, each of said plurality of vending machines including a machine control portion having associated therewith a communications control portion operable to transmit and receive short distance communication signals, said plurality of vending machines being positioned with respect to one another to be within range of said short distance communication signals, said positioned plurality of vending machines defining a peer-to-peer network having a wireless communications bus accessible through said communications control portions interconnecting said positioned plurality of vending machines for point-to-point communications, said first of said plurality of vending machines operable to receive a credit deposit made by a customer and to provide data representative of credit availability for vend purchasing over said wireless communications bus, said second of said plurality of vending machines operable to effect a vend dispensing operation of a product selected by a customer upon verification of appropriate vend conditions including sufficient credit availability for the vend selection made by the customer.

2. The system of claim 1 wherein at least a subset of said plurality of vending machines includes a plurality of vending machines at least one of which includes a credit entry portion and each of which is operable to vend a selected product therefrom upon verification of appropriate machine-specific vend conditions including the sufficiency of credit availability based upon credit deposits at said vending machine that includes a credit entry portion for the vend selection made by the customer.

3. The system of claim 2 wherein said plurality of vending machines of said subset are each separately operable to vend a selected product therefrom upon verification for the vend selection made by the customer at that vending machine of appropriate machine-specific vend conditions including the sufficiency of credit availability based upon credit deposits at said vending machine that includes a credit entry portion.

4. The system of claim 2 wherein each of said vending machines of said subset includes a credit entry portion and is independently operable to vend a selected product therefrom upon verification for the vend selection made by the customer at that vending machine of appropriate machine-specific vend conditions including the sufficiency of credit availability based upon credit deposits at that vending machine.

5. The system of claim 2 wherein said vending machine that includes a credit entry portion also includes a vend selection portion.

6. The system of claim 2 wherein said vending machine that includes a credit entry portion is a central data collection machine for said other vending machines of said subset and wherein said communications control portion for said central data collection machine includes a communications device configurable and operable to communicate over long distances with a central location distanced from said system.

7. The system of claim 6 wherein said communications device is a modem.

8. The system of claim 6 wherein said communications device is a long range radio frequency device.

9. The system of claim 6 wherein said communications device includes an interface to an internet device.

10. The system of claim 6 wherein said communications device a cellular telephone connection.

11. The system of claim 2 wherein each vending machine of said subset is operable to transmit credit availability data over said wireless communications bus for use by a different vending machine of said subset and to receive for its own use credit availability date transmitted over said wireless communications bus by a different vending machine.

12. The system of claim 11 wherein each vending machine of said subset is operable to utilize said received credit availability data to effect a vend dispensing operation of a product selected by a customer upon verification of appropriate vend conditions including sufficient credit availability for the vend selection made by the customer.

13. The system of claim 12 wherein said system includes a central data collection device being positioned to be within range of said communication signals of said plurality of vending machines and having a communications control portion configurable to effect an interchange of information over a wireless bus and operable to transmit and receive short distance communications signals over said wireless communications bus, which radio frequency signals can be retrieved from said wireless communications bus by and used in effecting the operation of one or more of said plurality of vending machines, said central data collection device operable to retrieve from said wireless communications bus and to centrally maintain within said peer-to-peer network for use by said plurality of vending machines through communications over said wireless communications bus customer-specific credit availability information as determined from amounts of deposits made by the customer in excess of the selected vends available for return to the customer.

14. The system of claim 13 wherein the central data collection device and each of the plurality of vending machines is operable to receive and send communications signals therebetween to effect a return to the customer of any excess amount of credit entry that exceeds the cost of the vended products.

15. The system of claim 13 wherein each vending machine has associated therewith, and operatively connected to said machine control portion thereof, a coin entry device.

16. The system of claim 13 wherein each vending machine has associated therewith, and operatively connected to said machine control portion thereof, a bill entry device.

17. The system of claim 13 wherein each vending machine has associated therewith, and operatively connected to said machine control portion thereof, a credit card data entry device.

18. The system of claim 13 wherein each vending machine has associated therewith, and operatively connected to said machine control portion thereof, device for selecting a desired vend.

19. The system of claim 13 wherein each vending machine has associated therewith, and operatively connected to said machine control portion thereof, a display device for a customer to visually determine the product or products he wants to purchase.

20. The system of claim 12 wherein said credit availability data transmitted over said wireless communications bus includes customer identification information.

21. The system of claim 20 wherein each vending machine having a vend selection portion includes a data entry device for entry by a customer of customer identification information for associating a vend selection made by a customer at one vending machine with credit availability data for that customer transmitted over said wireless communications bus by a different vending machine.

22. The system of claim 12 wherein each vending machine of said subset is operable, upon the vending of the selected product by such vending machine, to transmit updated credit availability data over said wireless communications bus for use by a different vending machine of said subset.

23. The system of claim 12 wherein at least a secondary subset of said subset includes a plurality of vending machines each of which is operable to transmit selection data over said wireless communications bus for use by a different vending machine and to receive for its own use selection data transmitted over said wireless communications bus by a different vending machine.

24. The system of claim 23 wherein selection information transmitted over said wireless communications bus includes customer identification information.

25. The system of claim 11 wherein said vending machine that includes a vend selection portion is operable to transmit selection information over said wireless communications bus for use by a different vending machine and at least a secondary subset of said subset includes a plurality of vending machines operable to retrieve said selection information from said wireless communications bus and to make use thereof to verify said machine-specific vend conditions.

26. The system of claim 1 wherein said communications control portion includes a baseband control firmware portion, a link manager firmware portion, a host controller interface firmware portion, and a transport firmware portion, said host controller interface firmware portion and said transport firmware portion being operatively connected to said machine control portion for exchanging information therewith.

27. The system of claim 13 wherein said communications signals transmitted by said communications control portion are short range radio frequency signals.

28. The system of claim 27 wherein said communications control portion is Bluetooth-compliant.

29. The system of claim 1 wherein said communications signals transmitted by said communications control portion are short distance radio frequency signals.

30. The system of claim 29 wherein said communications control portion is Bluetooth-compliant.

31. The system of claim 30 wherein at least a subset of said plurality of vending machines includes vending machines having vend function modules corresponding to said credit entry portion, said vend selection portion, and said vend dispensing portion, each such vending machine of said subset including at least two of said vend function modules and each said vend function module including a module control portion having an associated Bluetooth-compliant communications control portion operable to transmit and receive short distance radio frequency signals.

32. A system for controlling the operations of devices based on the accumulation of credit, the system including a credit entry mechanism having a credit entry portion for accepting money and credit entries and an associated control portion operable to accumulate the amount of credit entered by and available to a customer, at least one operation request mechanism responsive to customer activation to request performance of an operation, at least one device for performing an operation when the amount of credit available to a customer at least equals the cost of the operation to be performed, and a payback mechanism for returning the credit available that exceeds the value cost of the performed operation, said mechanisms and devices including a communications control portion configurable to effect the interchange of information over a wireless bus and operable to transmit and receive short distance communications signals, said mechanisms and devices being positioned with respect to one another to be within range of said short distance communications signals, said positioned mechanisms and devices defining a peer-to-peer network having a wireless communications bus accessible through said communications control portion interconnecting said positioned mechanisms and devices for point-to-point communications among the credit entry mechanism, the operation request mechanism, and the operation performing device, said communications control portions including transmitting and receiving devices that communicate with one another over said wireless bus.

33. The system of claim 32 wherein the devices being controlled include at least two vending machines each having a machine control portion for determining the value of credit available to a customer, a display portion for displaying information regarding a vending operation, a payback portion for paying back credit remaining available, and a vend portion for dispensing a product when the amount of credit available at least equals the cost of the dispensed product, each vending machine having a portion for transmitting and receiving communications signals for use in controlling the operations of said vending machines, said credit entry mechanism, operation request mechanism, and payback mechanism being distributed among said vending machines and being portions thereof.

34. The system of claim 33 wherein one of said vending machines is operable to retrieve from said wireless communications bus and to centrally maintain within said peer-to-peer network, for use by said vending machines through communications over said wireless communications bus, customer-specific credit availability information as determined from credit entries made by the customer in excess of the cost of the operations performed, said one vending machine being a central data collection device.

35. The system of claim 34 wherein said central data collection device is operable to transmit credit availability information over said wireless communications bus for use by other of said vending machines and to retrieve from said wireless communications bus for maintenance thereby of updated credit availability information transmitted over said wireless communications bus by said other of said vending machines when an operation is performed thereby.

36. The system of claim 35 wherein said communications signals transmitted by said communications control portion are short range radio frequency signals and said transmitting and receiving devices include radio frequency transmitting and receiving devices.

37. The system of claim 36 wherein said communications control portion is Bluetooth-compliant.

38. The system of claim 37 wherein said central data collection device includes a remote communications control portion for communicating over distances greater than the distances covered by said short range radio frequency signals of said Bluetooth-compliant communications control portions.

39. A system for vending products to a customer who has established a credit, including by depositing coins, paper money or by using a credit card, the system including:

at least one product vending machine and at least one vend operations control device, transmitting and receiving devices associated with each of the vending machines and the vend operations control device, said transmitting and receiving devices operable to transmit and receive short distance communication signals and forming a portion of communications control portions configurable to effect the interchange of information over a wireless bus and operable to effect communications among the vending machines and the vend operations control device, the vending machines of said system and the vend operations control device being positioned with respect to one another to be within range of said short distance communication signals, said positioned vending machines and control device defining a peer-to-peer network having a wireless communications bus accessible through said communications control portions interconnecting said positioned vending machines and control device for point-to-point communications, each of the vending machines including a vend dispensing portion operable to control the vending of a product therefrom when a signal from the vend operations control device indicating that the amount of credit entered at least equals the cost of the product desired to be vended becomes accessible over said wireless communications bus and is received by such vending machine, the transmitting devices associated with the vending machines being operable to transmit over said wireless communications bus a signal indicating that a product has been vended, the control device operable to establish the amount of credit remaining after a product has been vended, and a payback device to return to the customer an amount in excess of the cost of the product that has been vended.

40. The system of claim 39 wherein the vend operations control device includes a vending machine control portion that is operable to determine an overcredit amount by reducing the amount of credit entered for the customer based upon the number of products being vended and the cost thereof.

41. The system of claim 39 wherein said system includes a plurality of vending machines.

42. The system of claim 41 wherein the vending machines include a vend selection portion operable to select a product to be vended.

43. The system of claim 42 wherein each of the vending machines includes a credit entry portion and is independently operable to vend a selected product therefrom upon verification for the vend selection made by the customer at that vending machine of appropriate machine-specific vend conditions including the sufficiency of credit availability based upon credit entered at that vending machine.

44. The system of claim 41 wherein the vend operations control device is a central data collection machine for the vending machines and wherein said communications control portion thereof includes a communications device configurable and operable to communicate over long distances with a central location distanced from said system.

45. The system of claim 44 wherein said communications device is a modem.

46. The system of claim 44 wherein said communications device is a long range radio frequency device.

47. The system of claim 44 wherein said communications device includes an interface to an internet device.

48. The system of claim 44 wherein said communications device a cellular telephone connection.

49. The system of claim 44 wherein the control device is a vending machine.

50. A method of enabling wireless communications among a plurality of vending machines in a vending system and operation by one of such plurality of vending machines based upon credit deposits made at another of such plurality of vending machines, wherein each of the vending machines includes a machine control portion, at least a first of the vending machines includes a vend dispensing portion, at least a second of the vending machines includes a credit entry portion, and at least one of the vending machines includes a vend selection portion, comprising providing and associating with each of the plurality of vending machines a communications control portion associated with the machine control portion of the vending machine, said communications control portion configurable to effect the interchange of information over a wireless bus and operable to transmit and receive short distance communication signals, configuring the machine control portions of the vending machines and their associated communications control portions to be able to communicate with other devices in a peer-to-peer network over a wireless communications bus accessible through said communications control portions interconnecting the devices, positioning the plurality of vending machines with respect to one another to be within range of said short distance communication signals, the positioned plurality of vending machines defining a peer-to-peer network having a wireless communications bus accessible through said communications control portions interconnecting the positioned plurality of vending machines for point-to-point communications, configuring the first of said plurality of vending machines to receive a credit deposit made by a customer and to provide data representative of credit availability for vend purchasing over said wireless communications bus, configuring the second of said plurality of vending machines to effect a vend dispensing operation of a product selected by a customer upon verification of appropriate vend conditions including sufficient credit availability for the vend selection made by the customer.

51. The method of claim 50 wherein at least a subset of the plurality of vending machines includes a plurality of vending machines at least one of which includes a credit entry portion and each of which is operable to vend a selected product therefrom upon verification of appropriate machine-specific vend conditions including the sufficiency of credit availability based upon credit deposits at said vending machine that includes a credit entry portion for the vend selection made by the customer.

52. The method of claim 51 wherein the plurality of vending machines of the subset are each separately operable to vend a selected product therefrom upon verification for the vend selection made by the customer at that vending machine of appropriate machine-specific vend conditions including the sufficiency of credit availability based upon credit deposits at the vending machine that includes a credit entry portion.

53. The method of claim 51 wherein each of the vending machines of the subset includes a credit entry portion and is independently operable to vend a selected product therefrom upon verification for the vend selection made by the customer at that vending machine of appropriate machine-specific vend conditions including the sufficiency of credit availability based upon credit deposits at that vending machine.

54. The method of claim 51 wherein the vending machine that includes a credit entry portion also includes a vend selection portion.

55. The method of claim 51 wherein the communications control portion provided for the vending machine that includes a credit entry portion includes a communications device configurable and operable to communicate over long distances with a central location distanced from said system and including the steps of configuring the vending machine that includes a credit entry portion to act as a central data collection machine for the other vending machines of the subset, and configuring the remaining vending machines of the subset to communicate vend operation information to the central data collection machine.

56. The method of claim 55 wherein the communications device is a modem.

57. The method of claim 55 wherein the communications device is a long range radio frequency device.

58. The system of claim 55 the communications device includes an interface to an internet device.

59. The method of claim 55 wherein said communications device a cellular telephone connection.

60. The method of claim 55 wherein the remaining vending machines of the subset include credit entry portions and the vend operation information communicated to the central data collection machine includes credit entry information from the remaining vending machines of the subset.

61. The method of claim 53 wherein each vending machine of the subset is operable to transmit credit availability data over said wireless communications bus for use by a different vending machine of the subset and to receive for its own use credit availability date transmitted over said wireless communications bus by a different vending machine.

62. The method of claim 61 wherein each vending machine of the subset is operable to utilize said received credit availability data to effect a vend dispensing operation of a product selected by a customer upon verification of appropriate vend conditions including sufficient credit availability for the vend selection made by the customer.

63. The method of claim 61 wherein the communications control portion provided for one of the vending machines includes a communications device configurable and operable to communicate over long distances with a central location distanced from said system and including the steps of configuring the vending machine that includes such communications device to act as a central data collection machine for the other vending machines of the subset, and configuring the remaining vending machines of the subset to communicate vend operation information to the central data collection machine.

64. The system of claim 63 wherein each vending machine having a vend selection portion includes a data entry device for entry by a customer of customer identification information for associating a vend selection made by a customer at one vending machine with credit availability data for that customer transmitted over said wireless communications bus by a different vending machine.

65. The system of claim 62 wherein said credit availability data transmitted over said wireless communications bus includes customer identification information.

66. The system of claim 62 wherein each vending machine of the subset is operable, upon the vending of the selected product by such vending machine, to transmit updated credit availability data over the wireless communications bus for use by a different vending machine of the subset.

67. The system of claim 62 wherein at least a secondary subset of the subset includes a plurality of vending machines each which is operable to transmit selection data over the wireless communications bus for use by a different vending machine and to receive for its own use selection data transmitted over the wireless communications bus by a different vending machine.

68. The system of claim 67 Wherein selection information transmitted over the wireless communications bus includes customer identification information.

69. The system of claim 51 including the steps of configuring the vending machine that includes a vend selection portion to transmit selection information over the wireless communications bus for use by a different vending machine and configuring at least a secondary subset of vending machines of the subset to retrieve selection information from the wireless communications bus and to make use thereof to verify machine-specific vend conditions.

* * * * *

UNITED STATES PATENT AND TRADEMARK OFFICE

CERTIFICATE OF CORRECTION

PATENT NO. : 6,772,048 B1

DATED : August 3, 2004

INVENTOR(S) : Mark H. Leibu and Gilbert Van Cleve

It is certified that error appears in the above-identified patent and that said Letters Patent is hereby corrected as shown below:

Column 2,

Line 59, "$24 \geqq 38$" should be -- 24-38 --.

Signed and Sealed this

Twenty-first Day of September, 2004

JON W. DUDAS

*Director of the United States Patent and Trademark Office*